US012737900B2

(12) United States Patent
Shi et al.

(10) Patent No.: US 12,737,900 B2
(45) Date of Patent: Sep. 15, 2026

(54) ATTENTION-BASED REFINEMENT FOR DEPTH COMPLETION

(71) Applicant: QUALCOMM Incorporated, San Diego, CA (US)

(72) Inventors: Yunxiao Shi, San Diego, CA (US); Hong Cai, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/448,845

(22) Filed: Aug. 11, 2023

(65) Prior Publication Data

US 2025/0054168 A1 Feb. 13, 2025

(51) Int. Cl.
*G06K 9/00* (2022.01)
*G06T 7/50* (2017.01)

(52) U.S. Cl.
CPC ...... *G06T 7/50* (2017.01); *G06T 2207/10024* (2013.01); *G06T 2207/10028* (2013.01); *G06T 2207/20084* (2013.01)

(58) Field of Classification Search
CPC ............. G06T 7/50; G06T 2207/10024; G06T 2207/10028; G06T 2207/20084
See application file for complete search history.

(56) References Cited

U.S. PATENT DOCUMENTS 10,832,487 B1 * 11/2020 Ulbricht .................. G06F 3/011
11,494,937 B2 * 11/2022 Urtasun .................. G01S 17/86
11,579,629 B2 * 2/2023 Wu ...................... G05D 1/0088
12,333,730 B2 * 6/2025 Xiong ...................... G06T 7/11
2019/0289281 A1 * 9/2019 Badrinarayanan ...... G01S 17/86
2022/0026918 A1 * 1/2022 Guizilini ................ G01B 11/24
2022/0067950 A1 * 3/2022 Lv ............................ G06N 3/09
2023/0092248 A1 * 3/2023 Xiong ....................... G06T 7/11 382/103
2023/0230269 A1 * 7/2023 Yoo ...................... G06N 3/0442 382/106
2024/0127596 A1 * 4/2024 Singh .................... G01S 13/931
2024/0161319 A1 * 5/2024 Ingle ...................... H04N 23/56

FOREIGN PATENT DOCUMENTS

CN 108830192 A * 11/2018 ........... G06F 18/214
CN 110097589 A * 8/2019 ............... G06T 7/50
CN 114004754 B * 7/2022 ............. G06N 3/045

(Continued)

OTHER PUBLICATIONS

SDformer: Efficient End-to-End Transformer for Depth Completion, Jian Qian et al., IEEE, 2022, pp. 56-61 (Year: 200).*
Monocular Depth Estimation Primed by Salient Point Detection and Normalized Hessian Loss, Lam Huynh et al., IEEE, 2021, pp. 228-238 (Year: 2021).*
Robust Multimodal Depth Estimation using Transformer based Generative Adversarial Networks, Md Fahim Faysal Khan et al., ACM, 2022, pp. 3559-3568 (Year: 2022).*
HMS-Net: Hierarchical Multi-Scale Sparsity-Invariant Network for Sparse Depth Completion, Zixuan Huang et al., IEEE, 2019, pp. 3429-3441 (Year: 2019).*

(Continued)

*Primary Examiner* — Jayesh A Patel
(74) *Attorney, Agent, or Firm* — Seyfarth Shaw LLP

(57) ABSTRACT

A processor-implemented method for attention-based depth completion includes receiving, by an artificial neural network (ANN), an input. The input includes an image and a sparse depth measurement. The ANN extracts multi-scale visual features of the input. The ANN applies a self-attention mechanism to the multi-scale visual features to generate a set of attended multi-scale visual features. The ANN generates a dense depth map based on the set of attended multi-scale visual features.

28 Claims, 8 Drawing Sheets

(56) References Cited

FOREIGN PATENT DOCUMENTS

| | | | | | |
|---|---|---|---|---|---|
| CN | 116245930 | A | * | 6/2023 | ............. G06T 7/596 |
| CN | 114743079 | B | * | 5/2025 | ............. G06F 18/22 |
| GB | 2576548 | B | * | 2/2020 | ............... G06T 5/00 |
| WO | WO-2021013334 | A1 | * | 1/2021 | ............... G06T 7/50 |
| WO | WO-2022103171 | A1 | * | 5/2022 | ............... G06T 5/50 |
| WO | WO-2022265347 | A1 | * | 12/2022 | ........... G06T 3/4053 |

OTHER PUBLICATIONS

Huynh L., et al., "Monocular Depth Estimation Primed by Salient Point Detection and Normalized Hessian Loss", 2021 International Conference on 3D Vision (3DV), IEEE, Dec. 1, 2021, pp. 228-238.

International Search Report and Written Opinion—PCT/US2024/030604—ISA/EPO—Sep. 18, 2024.

Khan F. F., et al., "Robust Multimodal Depth Estimation Using Transformer Based Generative Adversarial Networks", Proceedings of the Genetic and Evolutionary Computation Conference, ACMPUB27, New York, NY, USA, Oct. 10, 2022, pp. 3559-3568.

Qian J., et al., "SDformer: Efficient End-to-End Transformer for Depth Completion", 2022 International Conference on Industrial Automation, Robotics and Control Engineering (IARCE), IEEE, Jun. 10, 2022, pp. 56-61.

* cited by examiner

ATTENTION-BASED REFINEMENT FOR DEPTH COMPLETION

FIELD OF THE DISCLOSURE

Aspects of the present disclosure generally relate to attention-based refinement for depth completion.

BACKGROUND

Artificial neural networks may comprise interconnected groups of artificial neurons (e.g., neuron models). The artificial neural network may be a computational device or be represented as a method to be performed by a computational device. Convolutional neural networks (CNNs) are a type of feed-forward artificial neural network. Convolutional neural networks may include collections of neurons that each have a receptive field and that collectively tile an input space. Convolutional neural networks, such as deep convolutional neural networks (DCNs), have numerous applications. In particular, these neural network architectures are used in various technologies, such as image recognition, speech recognition, acoustic scene classification, keyword spotting, autonomous driving, and other classification tasks.

Depth completion involves estimating a dense pixel-wise depth from a sparse map captured from a depth sensor. Depth completion is an important task in areas such as autonomous driving, robotics, simultaneous localization and mapping, extended reality (XR), and three-dimensional perception. It is desirable to utilize such applications on edge devices such as smartphones. However, conventional approaches for depth completion utilize iterative processing that may be computationally complex, involve a memory and power budget that may be prohibitive, and, in some cases, may be unsupported for resource limited devices.

SUMMARY

In some aspects of the present disclosure, a processor-implemented method performed by at least one processor includes receiving, by an artificial neural network (ANN), an input comprising an image and a sparse depth measurement. The method also includes extracting, by the ANN, multi-scale visual features of the input. The method further includes applying, by the ANN, a self-attention mechanism to the multi-scale visual features to generate a set of attended multi-scale visual features. The method further still includes generating, by the ANN, a dense depth map based on the set of attended multi-scale visual features.

Various aspects of the present disclosure are directed to an apparatus including means for receiving, by an artificial neural network (ANN), an input comprising an image and a sparse depth measurement. The apparatus also includes means for extracting, by the ANN, multi-scale visual features of the input. The apparatus additionally includes means for applying, by the ANN, a self-attention mechanism to the multi-scale visual features to generate a set of attended multi-scale visual features. The apparatus further includes means for generating, by the ANN, a dense depth map based on the set of attended multi-scale visual features.

In some aspects of the present disclosure, a non-transitory computer-readable medium with non-transitory program code recorded thereon is disclosed. The program code is executed by a processor and includes program code to receive, by an artificial neural network (ANN), an input comprising an image and a sparse depth measurement. The program code also includes program code to extract, by the ANN, multi-scale visual features of the input. The program code further includes program code to apply, by the ANN, a self-attention mechanism to the multi-scale visual features to generate a set of attended multi-scale visual features. The program code additionally includes program code to generate, by the ANN, a dense depth map based on the set of attended multi-scale visual features.

Various aspects of the present disclosure are directed to an apparatus having a memory and one or more processors coupled to the memory. The processor(s) is configured to receive, by an artificial neural network (ANN), an input comprising an image and a sparse depth measurement. The processor(s) is also configured to extract, by the ANN, multi-scale visual features of the input. The processor(s) is additionally configured to apply, by the ANN, a self-attention mechanism to the multi-scale visual features to generate a set of attended multi-scale visual features. The processor(s) is further configured to generate, by the ANN, a dense depth map based on the set of attended multi-scale visual features.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
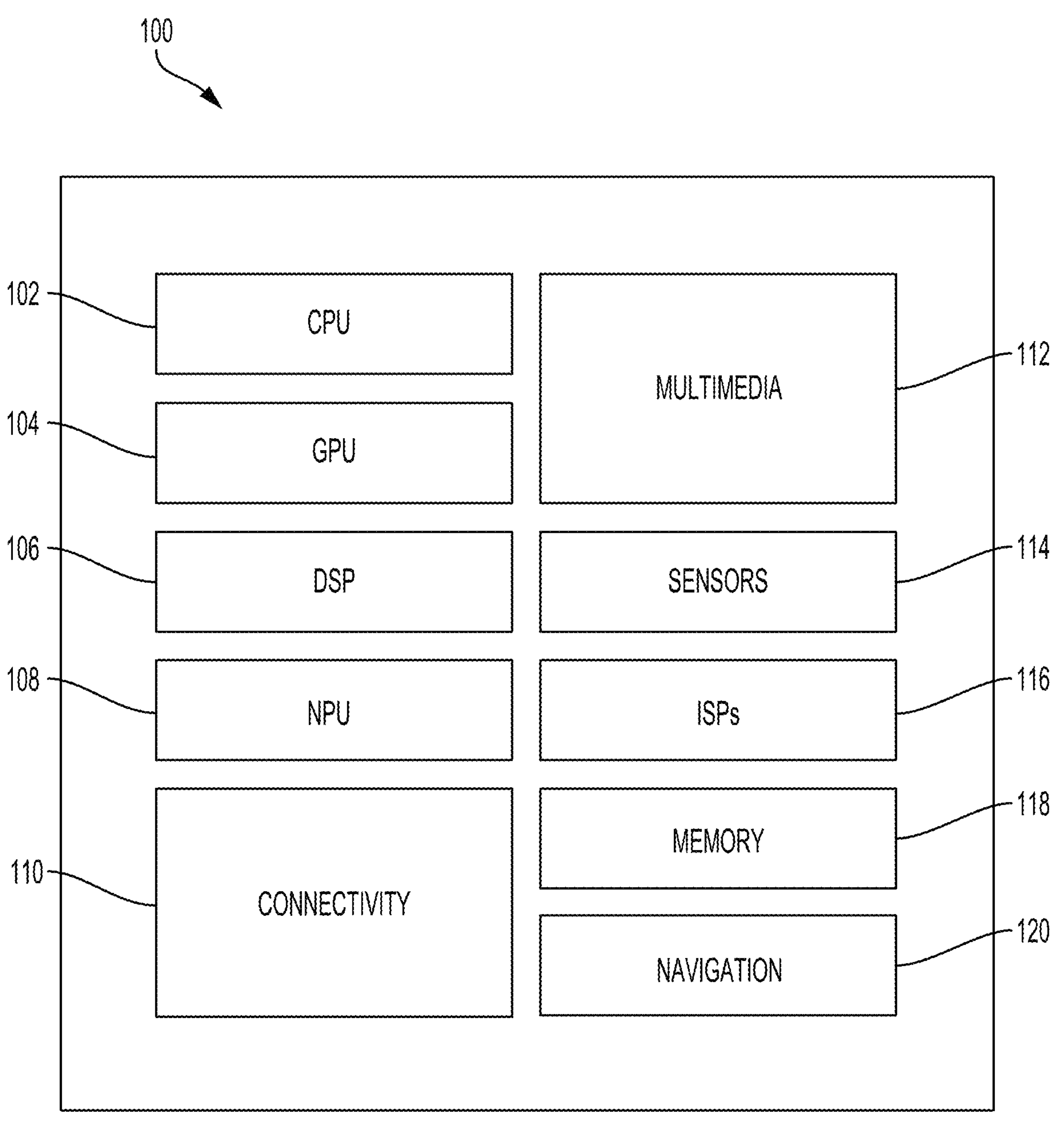
FIG. 1 illustrates an example implementation of a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, depth completion is an important task in areas such as autonomous driving, robotics, simultaneous localization and mapping, extended reality (XR), and three-dimensional perception. Depth completion involves estimating a dense pixel-wise depth from a sparse map captured from a depth sensor. That is, given an image captured by a single camera and sparse depth measurements, the distance of each pixel from the camera may be determined.

Conventional approaches rely on iterative processing and refinement for depth completion. However, the iterative processing uses deformable convolutions or dynamic graph propagation. Deformable convolutions add two-dimensional offsets to regular grid sampling locations in a standard convolution operation to deform the receptive field during input sampling. Deformable convolutions may enable a network to capture more fine-grained spatial patterns of an object in an image. Dynamic graph propagation, on the other hand, may update an initial depth value for a pixel based on the pixel neighbors and an affinity matrix that defines an amount of information passed between neighboring pixels.

Both deformable convolutions and dynamic graph propagation may produce high-quality depth completion. However, such approaches are computationally complex and may utilize significant computation and memory resources. Additionally, such approaches may be unsupported for on-device operation. Thus, performing depth completion on edge devices is challenging.

Accordingly, to address these and other challenges, aspects of the present disclosure are directed to attention-based refinement for depth completion. In accordance with various aspects of the present disclosure, an artificial neural network (ANN) may process an input including an image and a sparse depth measurement to extract multi-scale visual features. The ANN may apply self-attention to the extracted multi-scale visual features and generate a depth map based on the attended multi-scale visual features.

Particular aspects of the subject matter described in this disclosure can be implemented to realize one or more of the following potential advantages. In some examples, the described techniques (e.g., applying self-attention to the extracted multi-scale visual features and generating a depth map based on the attended multi-scale visual features) may reduce memory and/or power consumption and/or may enable performing of depth completion on a mobile device.

FIG. 1 illustrates an example implementation of a system-on-a-chip (SOC) 100, which may include a central processing unit (CPU) 102 or a multi-core CPU configured for attention-based refinement for depth completion. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may include code to receive, by an artificial neural network (ANN), an input. The input comprises an image and a sparse depth measurement. The general-purpose processor 102 may also include code to extract, by the ANN, multi-scale visual features of the input. The general-purpose processor 102 may include code to apply, by the ANN, a self-attention mechanism to the multi-scale visual features to generate a set of attended multi-scale visual features. The general-purpose processor 102 may also include code to generate, by the ANN, a dense depth map based on the set of attended multi-scale visual features.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
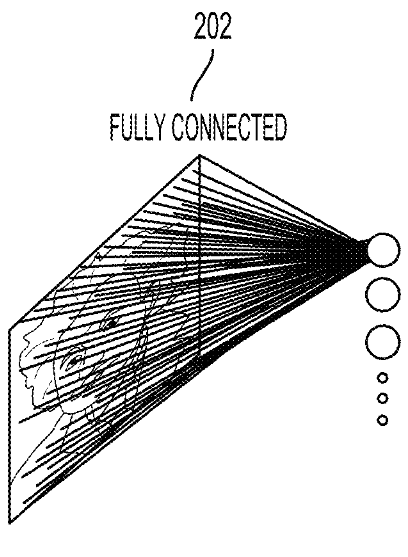
FIGS. 2A, 2B, and 2C are diagrams illustrating a neural network in accordance with various aspects of the present disclosure.
Figure 2B:
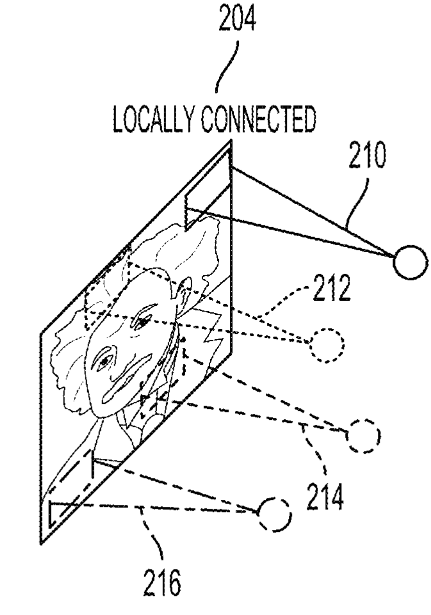

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
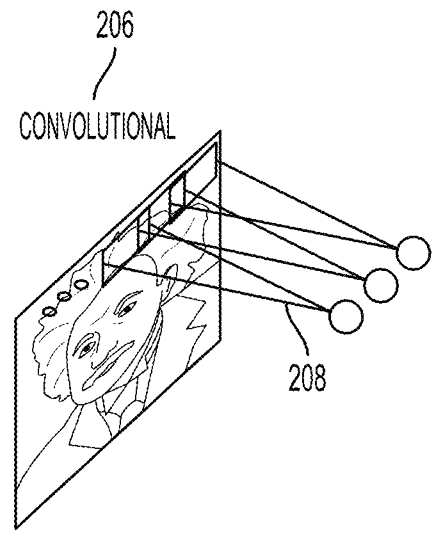

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
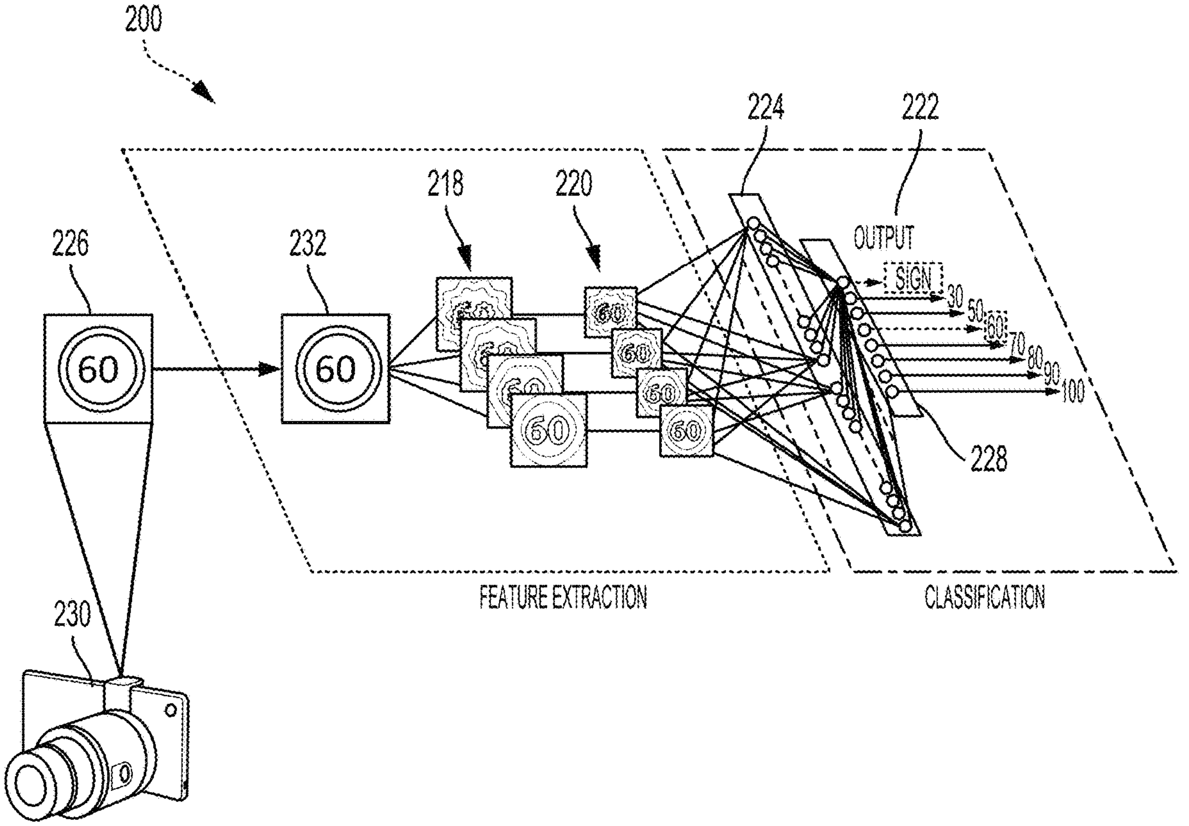
FIG. 2D is a diagram illustrating an exemplary deep convolutional network (DCN) in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown)

may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images (e.g., the speed limit sign of the image 226) and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3:
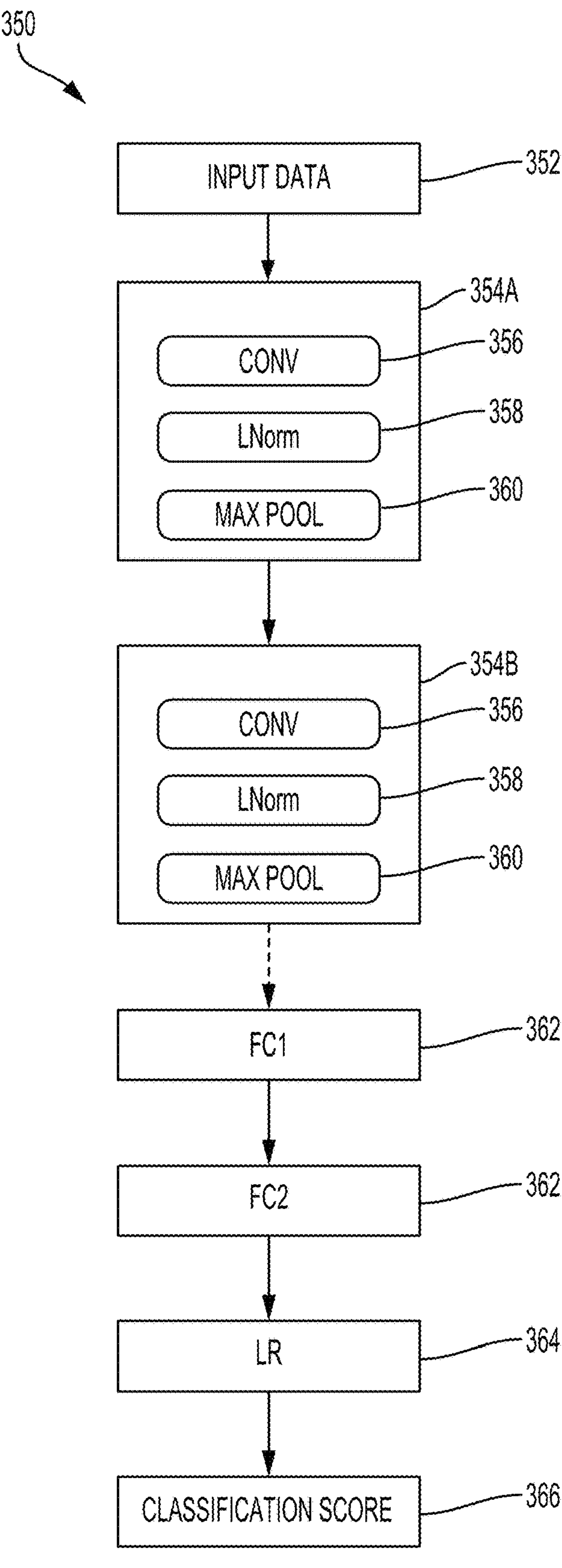
FIG. 3 is a block diagram illustrating an exemplary deep convolutional network (DCN) in accordance with various aspects of the present disclosure.

FIG. 3 is a block diagram illustrating a DCN 350. The DCN 350 may include multiple different types of layers based on connectivity and weight sharing. As shown in FIG. 3, the DCN 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

Although only two of the convolution blocks 354A, 354B are shown, the present disclosure is not so limiting, and instead, any number of the convolution blocks 354A, 354B may be included in the DCN 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 (e.g., FIG. 1) to achieve high performance and low power consumption. In alternative embodiments, the parallel filter banks may be loaded on the DSP 106 or an ISP 116 of an SOC 100. In addition, the DCN 350 may access other processing blocks that may be present on the SOC 100, such as sensor processor 114 and navigation module 120, dedicated, respectively, to sensors and navigation.

The DCN 350 may also include one or more fully connected layers 362 (FC1 and FC2). The DCN 350 may further include a logistic regression (LR) layer 364. Between each layer 356, 358, 360, 362, 364 of the DCN 350 are weights (not shown) that are to be updated. The output of each of the layers (e.g., 356, 358, 360, 362, 364) may serve as an input of a succeeding one of the layers (e.g., 356, 358, 360, 362, 364) in the DCN 350 to learn hierarchical feature representations from input data 352 (e.g., images, audio, video, sensor data and/or other input data) supplied at the first of the convolution blocks 354A. The output of the DCN 350 is a classification score 366 for the input data 352. The classification score 366 may be a set of probabilities, where each probability is the probability of the input data including a feature from a set of features.

Figure 4:
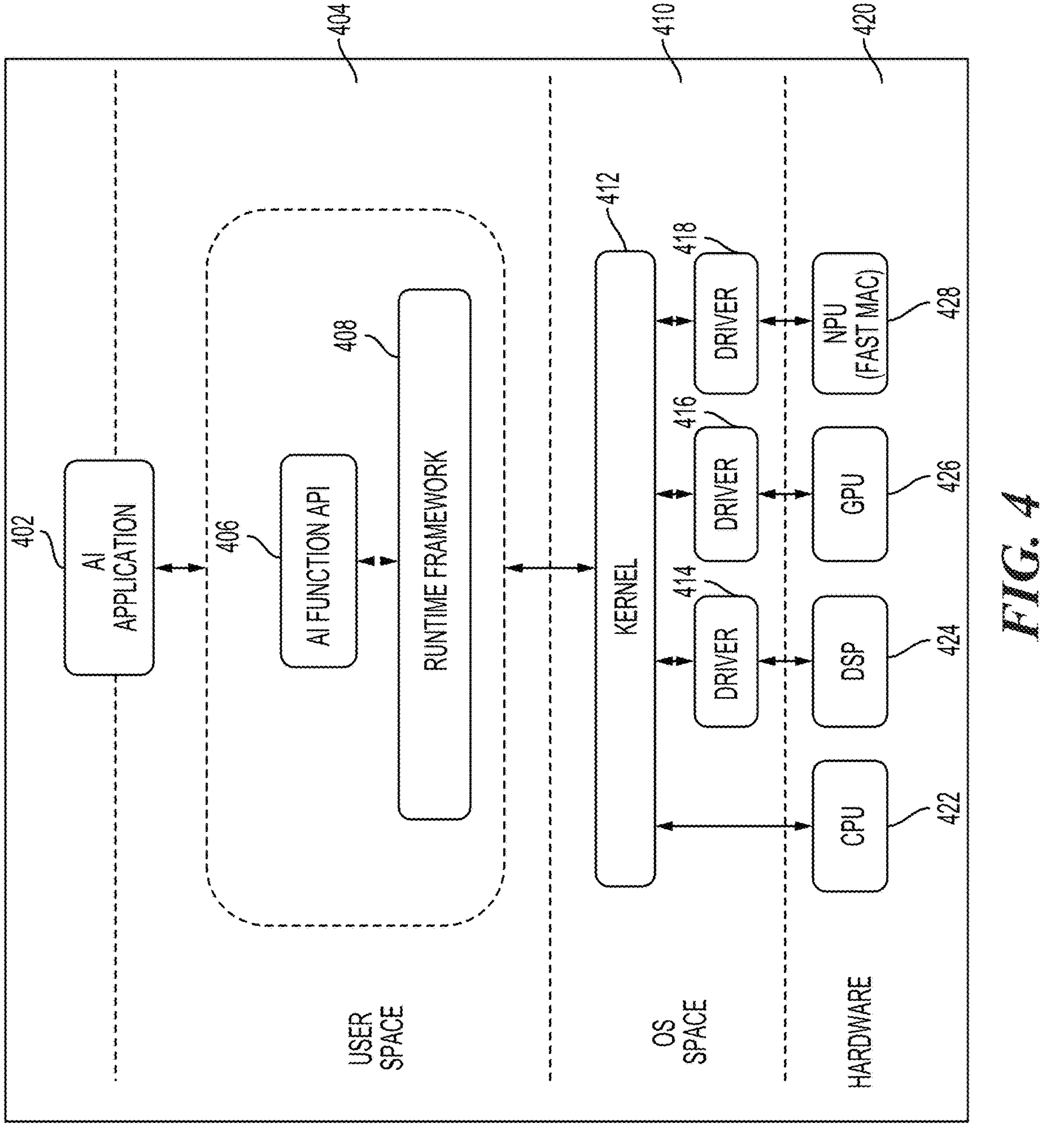
FIG. 4 is a block diagram illustrating an exemplary software architecture that may modularize artificial intelligence (AI) functions, in accordance various with aspects of the present disclosure.

FIG. 4 is a block diagram illustrating an exemplary software architecture 400 that may modularize artificial intelligence (AI) functions. Using the architecture 400, applications may be designed that may cause various processing blocks of an SOC 420 (for example a CPU 422, a DSP 424, a GPU 426 and/or an NPU 428) (which may be similar to SoC 100 of FIG. 1) to support attention-based refinement for depth completion for an AI application 402, according to aspects of the present disclosure. The architecture 400 may, for example, be included in a computational device, such as a smartphone.

The AI application 402 may be configured to call functions defined in a user space 404 that may, for example, provide for the detection and recognition of a scene indicative of the location at which the computational device including the architecture 400 currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API) 406. This request may ultimately rely on the output of a deep neural network configured to provide an inference response based on video and positioning data, for example.

The run-time engine 408, which may be compiled code of a runtime framework, may be further accessible to the AI application 402. The AI application 402 may cause the run-time engine 408, for example, to request an inference at a particular time interval or triggered by an event detected by the user interface of the AI application 402. When caused to provide an inference response, the run-time engine 408 may in turn send a signal to an operating system in an operating system (OS) space 410, such as a Kernel 412, running on the SOC 420. In some examples, the Kernel 412 may be a LINUX Kernel. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Depth completion involves estimating a dense pixel-wise depth from a sparse map captured from a depth sensor. Given an image captured by a single camera and sparse depth measurements, for example, from light detection and ranging (LiDAR) or a time-of-flight sensor, depth completion aims to estimate the distance of each pixel from the camera.

Depth completion plays an important role in various applications, including extended reality (XR), autonomous driving, camera image or video processing, and robotics, for example.

Conventional techniques for depth completion rely on iterative processing or refinement to achieve high-quality depth completion. Moreover, the iterative processing involves deformable convolutions or dynamic graph propagation. These operations are time consuming and computationally expensive from a power and memory perspective, which may be exacerbated in resource limited devices, such as smartphones or other mobile devices. Furthermore, deformable convolutions, dynamic graph propagation, and dynamic spatial propagation may not be supported on-device.

Accordingly, aspects of the present disclosure are directed to attention-based refinement for depth completion. In accordance with aspects of the present disclosure, an attention model may be leveraged as a refinement module. A neural network model may include a base neural network, such as a convolutional neural network (CNN) or a sparse-to-dense (S2D) network, for example, which may receive an image and a sparse depth measurement. The image and the sparse depth measurement may be concatenated and received as input by the base neural network. The base neural network may process the concatenated input to extract multi-scale visual features (e.g., spatial features or spectral features) of the concatenated input. That is, visual features may be extracted at multiple different scales (e.g., resolution) of the image, which may increase the range of features extracted.

Self-attention may be applied to the extracted multi-scale visual features to enable feature interaction/aggregation. Self-attention may be considered a mechanism that compares each element (e.g., a multi-scale visual feature) of an input with other elements (e.g., the other multi-scale visual features) of the input to identify portions of the input to attend to or focus on. In other words, self-attention allows elements of an input to interact with each other. Then, the interactions for each input may be aggregated to determine an attention score for each element of the input. The elements (e.g., multi-scale visual features) having the greatest attention score may be attended as contributing more to the output (e.g., depth). The neural network model may then generate a dense depth map based on the attended multi-scale visual features.

Figure 5:
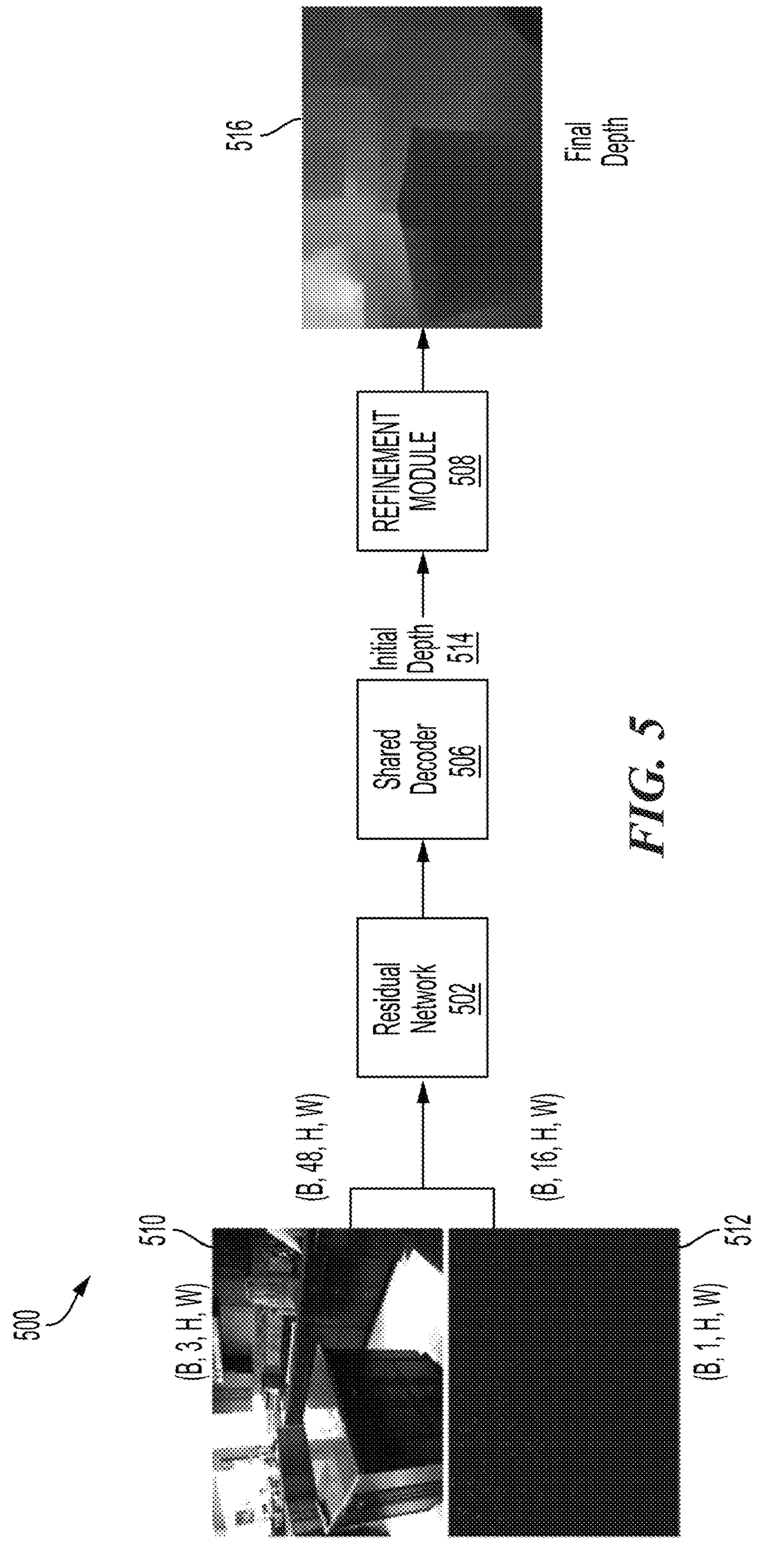
FIG. 5 is a block diagram illustrating a conventional depth completion approach.

FIG. 5 is a block diagram illustrating a conventional depth completion approach 500. Referring to FIG. 5, the conventional depth completion approach 500 includes a residual network 502 (also referred to as a residual neural network or ResNet), a shared decoder 506, and a refinement module 508. The residual network 502 receives an image 510 and a sparse depth measurement 512. The image 510 and the sparse depth measurement 512 are concatenated and processed by the residual network 502. The residual network 502 extracts features of the concatenated image 510 and sparse depth measurement 512. The extracted features are then provided to the shared decoder 506, which decodes the extracted features to generate an initial depth estimate 514. The initial depth estimate 514 is then provided to the refinement module 508 to improve the initial depth estimate 514. As described, the refinement module 508 implements an iterative process that includes repeatedly processing the initial depth estimate 514 via deformable convolutions, dynamic graph propagation, or other spatial propagation techniques to generate a final depth estimate 516.

Figure 6:
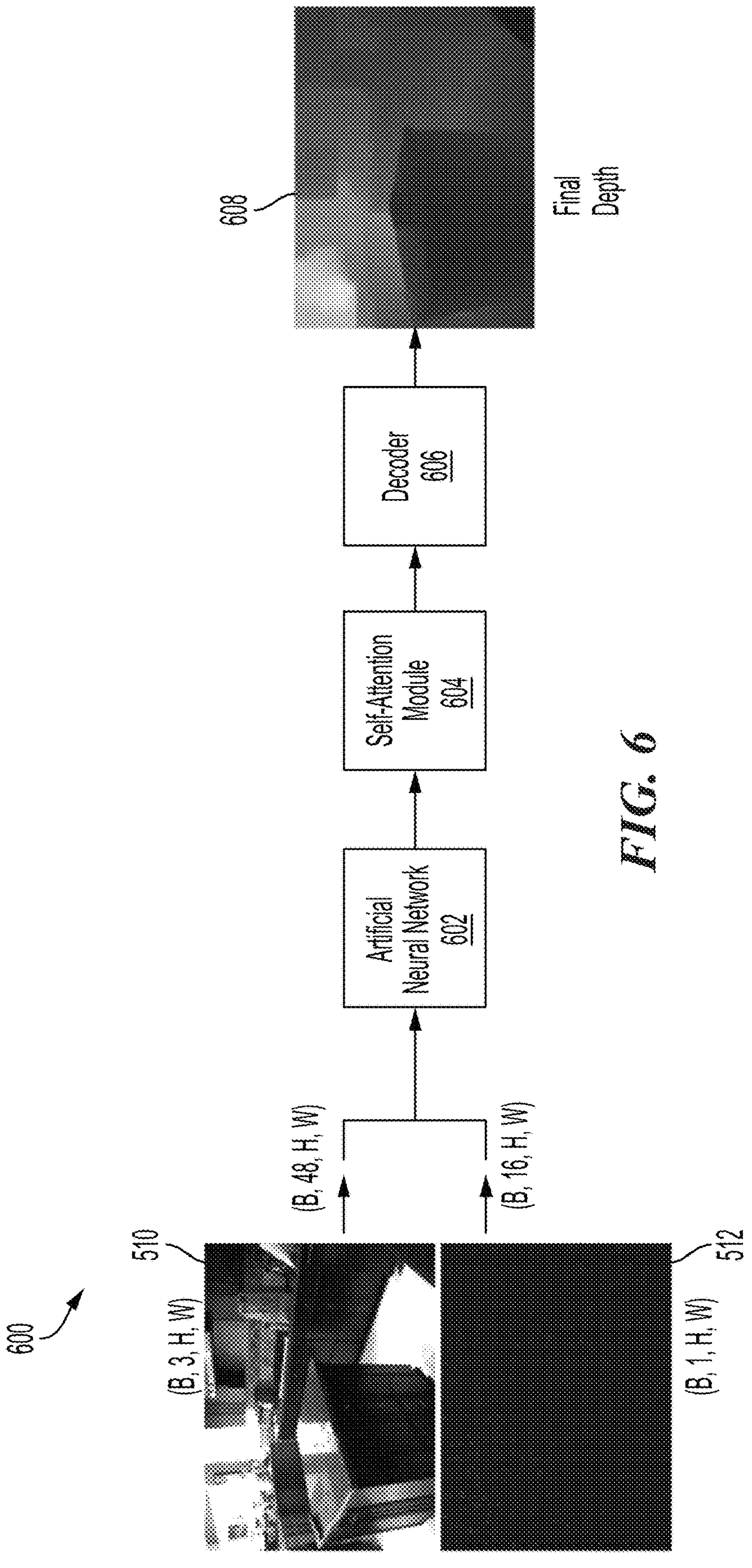
FIG. 6 is a block diagram illustrating an example architecture for image guided depth completion, in accordance with various aspects of the present disclosure.

FIG. 6 is a block diagram illustrating an example architecture 600 for image guided depth completion, in accordance with various aspects of the present disclosure. Referring to FIG. 6, the example architecture 600 includes an artificial neural network (ANN) 602. The artificial neural network 602 may comprise a convolutional neural network (e.g., 350 of FIG. 3) or the like, for example. In some aspects, the ANN 602 may comprise a sparse-to-dense network. The example architecture 600 may also include self-attention module 604 and a decoder 606. In other aspects, the ANN 602 may comprise any other suitable network.

The ANN 602 may receive an input including the image 510 and the sparse depth measurement 512. In various aspects, the image 510 may comprise a single image from a single camera. In some aspects, the image 510 may comprise a two-dimensional (2D) image. Additionally, the image 510 may comprise a red green blue (RGB) image, for instance. Although a single image 510 is shown, the ANN may be configured to receive and process a sequence of images, such as a video or a streaming multimedia input. For instance, the video may include a sequence of video frames, in which each frame of the video may be considered an image.

The sparse depth measurement 512 may comprise (but is not limited to) a LiDAR measurement, an RGB depth (RGBD) measurement, a time-of-flight (ToF) measurement, or other type of sparse depth measurements, for example. In some aspects, the image 510 and the sparse depth measurement 512 may be concatenated.

The inputs (e.g., 510, 512, or the concatenation of 510 and 512) may be supplied to the ANN 602. The ANN may extract multi-scale visual features of the inputs. The multi-scale visual features may be supplied to a self-attention module 604.

In some aspects, a depth-separable convolution may be applied to a subset of the scales of the input(s) (e.g., applied to four scales out of five). Depth-separable convolutions may split a convolution kernel into multiple smaller kernels, with each of the smaller kernels being applied to a different channel (e.g., an RGB input may have three channels corresponding to the colors). Then, a depthwise convolution and a pointwise convolution may be performed for each channel of the input. As such, in some aspects, a depthwise convolution and a pointwise convolution may be performed for a subset of the multi-scale visual features. Furthermore, in some aspects, the lowest scale of the multi-scale visual features may be down-sampled.

The self-attention module 604 may apply self-attention to the multi-scale visual features to generate attended multi-scale visual features. In various aspects of the present disclosure, the self-attention may be applied to the down-sampled features of the multi-scale visual features. In this case, a depth-separable deconvolution may be applied to the attended multi-scale visual features to restore the feature size.

The attended multi-scale visual features may be supplied to the decoder 606. The decoder 606 may decode the attended multi-scale visual features to generate a dense depth map 608 (also sometimes referred to as a final depth estimate).

Beneficially, the ANN 602 may generate the dense depth map 608 without the iterative refinement (e.g., refinement module 508) employed in the conventional depth completion approach 500. That is, the example architecture 600 may generate the dense depth map 608 by applying self-attention (e.g., using the self-attention module 604) to the extracted multi-scale visual features rather than employing deformable convolutions or dynamic graph propagation. As described, the iterative refinement including deformable convolutions, dynamic graph propagation, or other spatial propagation techniques are computationally complex and may involve significant memory and power consumption.

Moreover, unlike the conventional techniques involving deformable convolutions or dynamic graph propagations, the example architecture 600 utilizes self-attention (e.g., the module 604), which may be supported on-device. As, such, using the example architecture 600, a dense depth map 608 (e.g., depth completion) may be performed on an edge device or the like, such as a smartphone or other mobile device, for instance.

Figure 7:
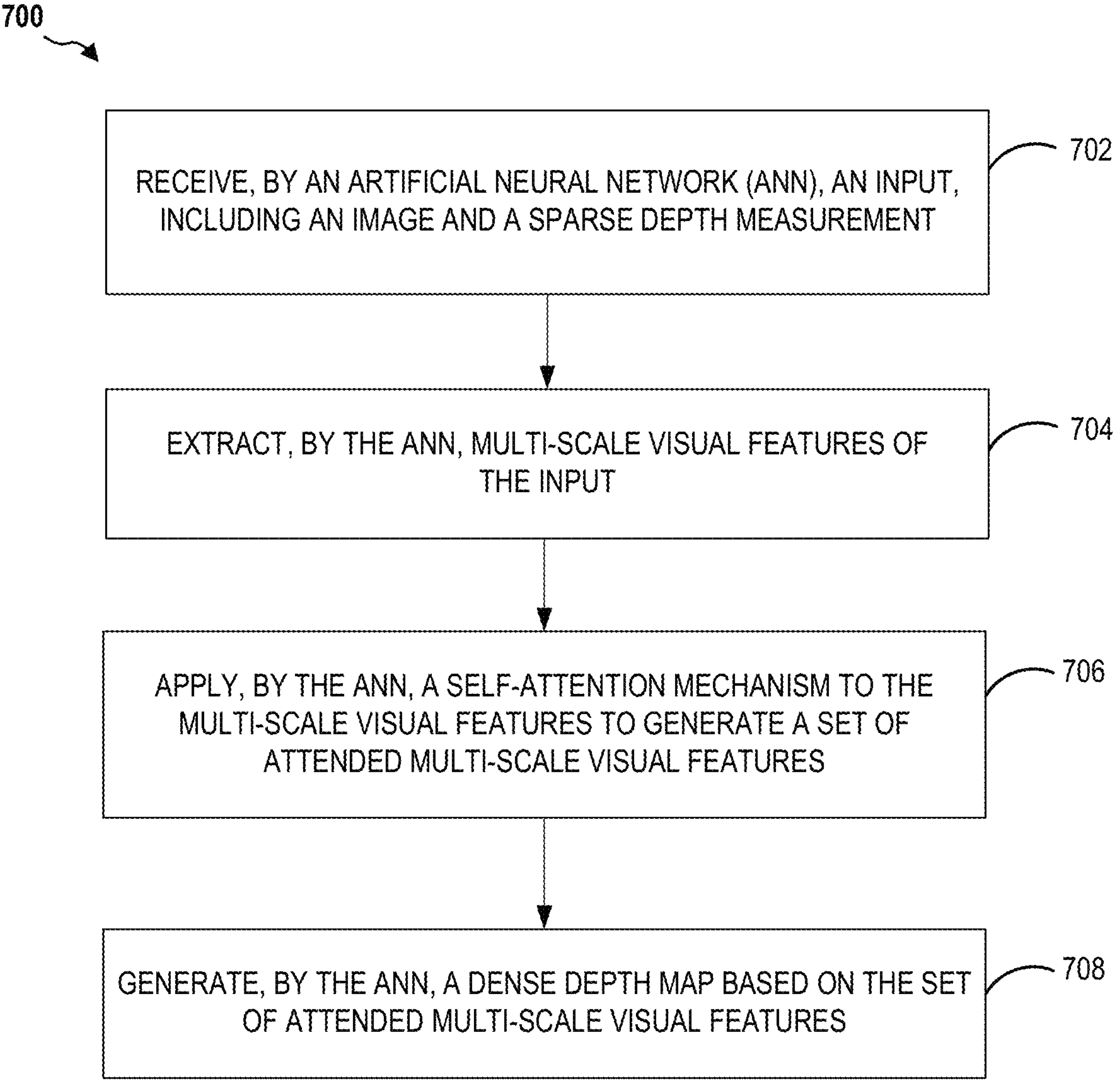
FIG. 7 is flow diagram illustrating a processor-implemented method for attention-based refinement for depth completion, in accordance with various aspects of the present disclosure.

FIG. 7 is flow diagram illustrating a processor-implemented method 700 for attention-based refinement for depth completion, in accordance with aspects of the present disclosure. The processor-implemented method 700 may be performed by one or more processors, such as the CPU (e.g., 102, 422), GPU (e.g., 104, 426), DSP (e.g., 106, 424), and/or NPU (e.g., 108, 428), for example.

As shown in FIG. 7, at block 702, the at least one processor receives, by an artificial neural network (ANN), an input. The input includes an image and a sparse depth measurement. For example, as described with respect to various aspects, the image 510 may comprise a single image from a single camera. In some aspects, the image 510 may comprise a red green blue (RGB) image, for instance. The sparse depth measurement 512 may comprise a LiDAR measurement, an RGB depth (RGBD) measurement, a time-of-flight (ToF) measurement, or other type of sparse depth measurements, for example. In some aspects, the image 510 and the sparse depth measurement 512 may be concatenated.

At block 704, the at least one processor extracts, by the ANN, multi-scale visual features of the input. For instance, as described with reference to FIG. 6, the ANN 602 may extract multi-scale visual features of the inputs. In some aspects, a depth-separable convolution may be applied to a subset of the scales of the input (e.g., applied to four scales out of five). Furthermore, in some aspects. the lowest scale of the multi-scale visual features may be down-sampled.

At block 706, the at least one processor applies, by the ANN, a self-attention mechanism to the multi-scale visual features to generate a set of attended multi-scale visual features. For instance, as described with reference to FIG. 6, the self-attention module 604 may apply self-attention to the multi-scale visual features to generate attended multi-scale visual features. In some aspects, the self-attention may be applied on the down-sampled features of the multi-scale visual features. In this case, a depth-separable deconvolution may be applied to the attended multi-scale visual features to restore the feature size.

At block 708, the at least one processor generates, by the ANN, a dense depth map based on the set of attended multi-scale visual features. For instance, as described with reference to FIG. 6, the attended multi-scale visual features may be supplied to the decoder 606. The decoder 606 may decode the attended multi-scale visual features to generate the dense depth map 608.

Implementation examples are provided in the following numbered clauses.

1. A processor-implemented method performed by at least one processor, the processor-implemented method comprising:
   receiving, by an artificial neural network (ANN), an input comprising an image and a sparse depth measurement;
   extracting, by the ANN, multi-scale visual features of the input;
   applying, by the ANN, a self-attention mechanism to the multi-scale visual features to generate a set of attended multi-scale visual features; and
   generating, by the ANN, a dense depth map based on the set of attended multi-scale visual features.
2. The processor-implemented method of clause 1, in which the sparse depth measurement comprises a light detection and ranging (LiDAR) measurement, a red green blue depth (RGBD) measurement, or a time-of-flight (ToF) measurement.

3. The processor-implemented method of clause 1 or 2, wherein the processor-implemented method is performed by at least one processor of a mobile device.

4. The processor-implemented method of any of clauses 1-3, further comprising implementing the dense depth map in an extended reality (XR) application, an autonomous driving application, a robotics application, or an image processing application.

5. The processor-implemented method of any of clauses 1-4, further comprising processing, by the ANN, the multi-scale visual features by applying a depth-separable convolution to a subset of the multi-scale visual features.

6. The processor-implemented method of any of clauses 1-5, in which the ANN comprises a sparse-to-dense (S2D) network.

7. The processor-implemented method of any of clauses 1-6, in which the ANN comprises a convolutional neural network (CNN).

8. The processor-implemented method of any of clauses 1-7, in which the image is captured by a single camera.

9. The processor-implemented method of any of clauses 1-8, wherein the processor-implemented method is performed by at least one processor of a mobile device, wherein the single camera is included in the mobile device.

10. An apparatus, comprising:
   at least one memory; and
   at least one processor coupled to the at least one memory, the at least one processor configured to:
      receive, by an artificial neural network (ANN), an input comprising an image and a sparse depth measurement;
      extract, by the ANN, multi-scale visual features of the input;
      apply, by the ANN, a self-attention mechanism to the multi-scale visual features to generate a set of attended multi-scale visual features; and
      generate, by the ANN, a dense depth map based on the set of attended multi-scale visual features.

11. The apparatus of clause 10, in which the sparse depth measurement comprises a light detection and ranging (LiDAR) measurement, a red green blue depth (RGBD) measurement, or a time-of-flight (ToF) measurement.

12. The apparatus of clause 10 or 11, in which the at least one processor is included in a mobile device.

13. The apparatus of any of clauses 10-12, in which the at least one processor is further configured to implement the dense depth map in an extended reality (XR) application, an autonomous driving application, a robotics application, or an image processing application.

14. The apparatus of any of clauses 10-13, in which the at least one processor is further configured to process, by the ANN, the multi-scale visual features by applying a depth-separable convolution to a subset of the multi-scale visual features.

15. The apparatus of any of clauses 10-14, in which the ANN comprises a sparse-to-dense (S2D) network.

16. The apparatus of any of clauses 10-15, in which the ANN comprises a convolutional neural network (CNN).

17. The apparatus of any of clauses 10-16, in which the image is captured by a single camera.

18. The apparatus of any of clauses 10-17, in which the at least one processor and the single camera are included in a mobile device.

19. A non-transitory computer-readable medium having program code recorded thereon, the program code executed by at least one processor and comprising:
   program code to receive, by an artificial neural network (ANN), an input comprising an image and a sparse depth measurement;
   program code to extract, by the ANN, multi-scale visual features of the input;
   program code to apply, by the ANN, a self-attention mechanism to the multi-scale visual features to generate a set of attended multi-scale visual features; and
   program code to generate, by the ANN, a dense depth map based on the set of attended multi-scale visual features.

20. The non-transitory computer-readable medium of clause 19, in which the sparse depth measurement comprises a light detection and ranging (LiDAR) measurement, a red green blue depth (RGBD) measurement, or a time-of-flight (ToF) measurement.

21. The non-transitory computer-readable medium of clause 19 or 20, in which the program code is included in a mobile device and the program code is executed by the at least one processor of the mobile device.

22. The non-transitory computer-readable medium of any of clauses 19-21, further comprising program code to implement the dense depth map in an extended reality (XR) application, an autonomous driving application, a robotics application, or an image processing application.

23. The non-transitory computer-readable medium of any of clauses 19-22, in which the program code comprises program code to process, by the ANN, the multi-scale visual features by applying a depth-separable convolution to a subset of the multi-scale visual features.

24. The non-transitory computer-readable medium of any of clauses 19-23, in which the ANN comprises a sparse-to-dense (S2D) network.

25. The non-transitory computer-readable medium of any of clauses 19-24, in which the image is captured by a single camera.

26. An apparatus, comprising:
   means for receiving, by an artificial neural network (ANN), an input comprising an image and a sparse depth measurement;
   means for extracting, by the ANN, multi-scale visual features of the input;
   means for applying, by the ANN, a self-attention mechanism to the multi-scale visual features to generate a set of attended multi-scale visual features; and
   means for generating, by the ANN, a dense depth map based on the set of attended multi-scale visual features.

27. The apparatus of clause 26, in which the sparse depth measurement comprises a light detection and ranging (LiDAR) measurement, a red green blue depth (RGBD) measurement, or a time-of-flight (ToF) measurement.

28. The apparatus of clause 26 or 27, in which the apparatus comprises a mobile device.

29. The apparatus of any of clauses 26-28, further comprising means for implementing the dense depth map in an extended reality (XR) application, an autonomous driving application, a robotics application, or an image processing application.

30. The apparatus of any of clauses 26-29, further comprising means for processing, by the ANN, the multi-scale visual features by applying a depth-separable convolution to a subset of the multi-scale visual features.

31. The apparatus of any of clauses 26-30, in which the ANN comprises a sparse-to-dense (S2D) network.

32. The apparatus of any of clauses 26-31, in which the image is captured by a single camera.

In some aspects, the receiving means, extracting means, applying means, and/or generating means may be the CPU 102, program memory associated with the CPU 102/422, the dedicated memory block 118, fully connected layers 362, GPU 104/426, NPU 108/428 and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method performed by at least one processor, the processor-implemented method comprising:

receiving, by an artificial neural network (ANN), an input comprising an image and a sparse depth measurement;

extracting, by the ANN, visual features of the input at multiple different scales to produce multi-scale visual features of the input, the multi-scale visual features comprising visual features at each of the multiple different scales;

applying, by the ANN, a self-attention mechanism to a subset of the multi-scale visual features to generate a set of attended multi-scale visual features, the subset comprising visual features at fewer than all of the multiple different scales; and generating, by the ANN, a dense depth map based on the set of attended multi-scale visual features.

2. The processor-implemented method of claim 1, in which the sparse depth measurement comprises a light detection and ranging (LiDAR) measurement, a red green blue depth (RGBD) measurement, or a time-of-flight (ToF) measurement.

3. The processor-implemented method of claim 1, wherein the processor-implemented method is performed by at least one processor of a mobile device.

4. The processor-implemented method of claim 1, further comprising implementing the dense depth map in an extended reality (XR) application, an autonomous driving application, a robotics application, or an image processing application.

5. The processor-implemented method of claim 1, further comprising processing, by the ANN, the multi-scale visual features by applying a depth-separable convolution to the subset of the multi-scale visual features.

6. The processor-implemented method of claim 1, in which the ANN comprises a sparse-to-dense (S2D) network.

7. The processor-implemented method of claim 1, in which the ANN comprises a convolutional neural network (CNN).

8. The processor-implemented method of claim 1, in which the image is captured by a single camera.

9. The processor-implemented method of claim 8, wherein the processor-implemented method is performed by at least one processor of a mobile device, wherein the single camera is included in the mobile device.

10. An apparatus, comprising:

at least one memory; and at least one processor coupled to the at least one memory, the at least one processor configured to:

receive, by an artificial neural network (ANN), an input comprising an image and a sparse depth measurement;

extract, by the ANN, visual features of the input at multiple different scales to produce multi-scale visual features of the input, the multi-scale visual features comprising visual features at each of the multiple different scales;

apply, by the ANN, a self-attention mechanism to a subset of the multi-scale visual features to generate a set of attended multi-scale visual features, the subset comprising visual features at fewer than all of the multiple different scales; and generate, by the ANN, a dense depth map based on the set of attended multi-scale visual features.

11. The apparatus of claim 10, in which the sparse depth measurement comprises a light detection and ranging (LiDAR) measurement, a red green blue depth (RGBD) measurement, or a time-of-flight (ToF) measurement.

12. The apparatus of claim 10, in which the at least one processor is included in a mobile device.

13. The apparatus of claim 10, in which the at least one processor is further configured to implement the dense depth map in an extended reality (XR) application, an autonomous driving application, a robotics application, or an image processing application.

14. The apparatus of claim 10, in which the at least one processor is further configured to process, by the ANN, the multi-scale visual features by applying a depth-separable convolution to the subset of the multi-scale visual features.

15. The apparatus of claim 10, in which the ANN comprises a sparse-to-dense (S2D) network.

16. The apparatus of claim 10, in which the ANN comprises a convolutional neural network (CNN).

17. The apparatus of claim 10, in which the image is captured by a single camera.

18. The apparatus of claim 17, in which the at least one processor and the single camera are included in a mobile device.

19. A non-transitory computer-readable medium having program code recorded thereon, the program code executed by at least one processor and comprising:

program code to receive, by an artificial neural network (ANN), an input comprising an image and a sparse depth measurement;

program code to extract, by the ANN, visual features of the input at multiple different scales to produce multi-scale visual features of the input, the multi-scale visual features comprising visual features at each of the multiple different scales;

program code to apply, by the ANN, a self-attention mechanism to a subset of the multi-scale visual features to generate a set of attended multi-scale visual features, the subset comprising visual features at fewer than all of the multiple different scales; and program code to generate, by the ANN, a dense depth map based on the set of attended multi-scale visual features.

20. The non-transitory computer-readable medium of claim 19, in which the sparse depth measurement comprises a light detection and ranging (LiDAR) measurement, a red green blue depth (RGBD) measurement, or a time-of-flight (ToF) measurement.

21. The non-transitory computer-readable medium of claim 19, in which the program code comprises program code to process, by the ANN, the multi-scale visual features by applying a depth-separable convolution to the subset of the multi-scale visual features.

22. The non-transitory computer-readable medium of claim 19, in which the ANN comprises a sparse-to-dense (S2D) network.

23. The non-transitory computer-readable medium of claim 19, in which the image is captured by a single camera.

24. An apparatus, comprising:

means for receiving, by an artificial neural network (ANN), an input comprising an image and a sparse depth measurement;

means for extracting, by the ANN, visual features of the input at multiple different scales to produce multi-scale visual features of the input, the multi-scale visual features comprising visual features at each of the multiple different scales;

means for applying, by the ANN, a self-attention mechanism to a subset of the multi-scale visual features to generate a set of attended multi-scale visual features, the subset comprising visual features at fewer than all of the multiple different scales; and means for generating, by the ANN, a dense depth map based on the set of attended multi-scale visual features.

25. The apparatus of claim 24, in which the sparse depth measurement comprises a light detection and ranging (LiDAR) measurement, a red green blue depth (RGBD) measurement, or a time-of-flight (ToF) measurement.

26. The apparatus of claim 24, further comprising means for processing, by the ANN, the multi-scale visual features by applying a depth-separable convolution to the subset of the multi-scale visual features.

27. The apparatus of claim 24, in which the ANN comprises a sparse-to-dense (S2D) network.

28. The apparatus of claim 24, in which the image is captured by a single camera.

* * * * *